(12) United States Patent
Yuan et al.

(10) Patent No.: US 9,007,719 B1
(45) Date of Patent: Apr. 14, 2015

(54) SYSTEMS AND METHODS FOR USING DOUBLE MASK TECHNIQUES TO ACHIEVE VERY SMALL FEATURES

(71) Applicant: Western Digital (Fremont), LLC, Fremont, CA (US)

(72) Inventors: Hongping Yuan, Fremont, CA (US); Bing K. Yen, Cupertino, CA (US); Ling Wang, San Ramon, CA (US); Xianzhong Zeng, Fremont, CA (US); Dujiang Wan, Fremont, CA (US); Hai Sun, Milpitas, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/230,828

(22) Filed: Mar. 31, 2014

Related U.S. Application Data (60) Provisional application No. 61/894,540, filed on Oct. 23, 2013.

(51) Int. Cl.
*G11B 5/127* (2006.01)
*G11B 5/31* (2006.01)

(52) U.S. Cl.
CPC .................................. *G11B 5/3163* (2013.01)

(58) Field of Classification Search
USPC ....................................................... 360/125.1
See application file for complete search history.

(56) References Cited

U.S. PATENT DOCUMENTS

| | | |
|---|---|---|
| 5,349,745 A | 9/1994 | Kawabe et al. |
| 5,438,747 A | 8/1995 | Krounbi et al. |
| 5,867,890 A | 2/1999 | Hsiao et al. |
| 5,874,010 A | 2/1999 | Tao et al. |
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,043,960 A | 3/2000 | Chang et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |

(Continued)

FOREIGN PATENT DOCUMENTS

JP          2006331612          12/2006

OTHER PUBLICATIONS

Mallary, et al., "One Terabit per Square Inch Perpendicular Recording Conceptual Design," IEEE Transactions on Magnetics, vol. 38, No. 4, Jul. 2002, pp. 1719-1724.

*Primary Examiner* — Mark Blouin (57) ABSTRACT

System and methods are provided for the manufacture of a magnetic write head including a pole and yoke region, and a nose shape transition region connecting the yoke to the pole having very small minimum radius of curvature, providing for a sharp transition. A double mask technique is used providing for the adjustment of an offset and illumination conditions between the first and second mask, which provides the capability of tuning the shape of the transition region, and achieving features that would otherwise not be achievable due to distortions caused by optical proximity effect.

19 Claims, 6 Drawing Sheets

(56) References Cited

U.S. PATENT DOCUMENTS

| | | | |
|---|---|---|---|
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,472,107 B1 | 10/2002 | Chan |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,675 B1 | 1/2003 | Shukh et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,579,651 B2 | 6/2003 | Subramanian et al. |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |

(56) References Cited

U.S. PATENT DOCUMENTS

| | | |
|---|---|---|
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,692,898 B2 | 2/2004 | Ning |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,014 B2 | 5/2004 | Lin et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,738,223 B2 | 5/2004 | Sato et al. |
| 6,744,608 B1 | 6/2004 | Chen et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,177 B2 | 3/2005 | Pinarbasi et al. |
| 6,861,937 B1 | 3/2005 | Feng et al. |
| 6,862,798 B2 | 3/2005 | Kruger et al. |
| 6,870,712 B2 | 3/2005 | Chen et al. |
| 6,872,467 B2 | 3/2005 | Qian et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,697 B2 | 5/2005 | Nakamura et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,952,325 B2 | 10/2005 | Sato et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,983,531 B2 | 1/2006 | Horng et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,024,756 B2 | 4/2006 | Le et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,070,698 B2 | 7/2006 | Le |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,120,988 B2 | 10/2006 | Le et al. |
| 7,120,989 B2 | 10/2006 | Yang et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,186,348 B2 | 3/2007 | Chen et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,206,166 B2 | 4/2007 | Notsuke et al. |
| 7,211,339 B1 | 5/2007 | Seagle et |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |

(56) References Cited

U.S. PATENT DOCUMENTS

| | | |
|---|---|---|
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,380,332 B2 | 6/2008 | Bedell et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,441,325 B2 | 10/2008 | Gao et al. |
| 7,443,632 B1 | 10/2008 | Stoev et al. |
| 7,444,740 B1 | 11/2008 | Chung et al. |
| 7,464,457 B2 | 12/2008 | Le et al. |
| 7,469,467 B2 | 12/2008 | Gao et al. |
| 7,493,688 B1 | 2/2009 | Wang et al. |
| 7,508,626 B2 | 3/2009 | Ichihara et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,663,839 B2 | 2/2010 | Sasaki et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,793,406 B2 * | 9/2010 | Zheng ..................... 29/603.16 |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,892,706 B2 | 2/2011 | Baidya et al. |
| 7,898,773 B2 | 3/2011 | Han et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 7,990,651 B2 * | 8/2011 | Hsiao et al. ................ 360/122 |
| 8,008,912 B1 | 8/2011 | Shang |
| 8,011,084 B2 * | 9/2011 | Le et al. ..................... 29/603.16 |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,027,125 B2 | 9/2011 | Lee et al. |
| 8,028,400 B2 * | 10/2011 | Bonhote et al. ............ 29/603.16 |
| 8,066,892 B2 | 11/2011 | Guthrie et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,102,622 B2 * | 1/2012 | Yamaguchi et al. ..... 360/125.03 |
| 8,104,166 B1 | 1/2012 | Zhang et al. |
| 8,116,043 B2 | 2/2012 | Leng et al. |
| 8,116,171 B1 | 2/2012 | Lee |
| 8,117,738 B2 | 2/2012 | Han et al. |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,189,292 B2 | 5/2012 | Pentek et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |

(56) References Cited

U.S. PATENT DOCUMENTS

| | | |
|---|---|---|
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,333,898 B2 | 12/2012 | Brown et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |

(56) References Cited

U.S. PATENT DOCUMENTS

| | | |
|---|---|---|
| 2001/0001256 A1 | 5/2001 | Hsiao |
| 2003/0076630 A1 | 4/2003 | Sato et al. |
| 2004/0184191 A1 | 9/2004 | Ichihara et al. |
| 2004/0229430 A1 | 11/2004 | Findeis et al. |
| 2005/0024779 A1 | 2/2005 | Le et al. |
| 2005/0066517 A1 | 3/2005 | Bedell et al. |
| 2005/0117251 A1 | 6/2005 | Matono et al. |
| 2005/0185332 A1 | 8/2005 | Hsiao et al. |
| 2005/0241140 A1 | 11/2005 | Baer et al. |
| 2005/0264949 A1 | 12/2005 | Gao et al. |
| 2006/0028762 A1 | 2/2006 | Gao et al. |
| 2006/0174474 A1 | 8/2006 | Le |
| 2006/0234483 A1 | 10/2006 | Araki et al. |
| 2006/0288565 A1 | 12/2006 | Le et al. |
| 2007/0026537 A1 | 2/2007 | Jiang et al. |
| 2007/0026538 A1 | 2/2007 | Jayasekara |
| 2007/0113395 A1 | 5/2007 | Dulay et al. |
| 2007/0183093 A1 | 8/2007 | Le et al. |
| 2007/0245544 A1 | 10/2007 | Allen et al. |
| 2007/0245545 A1 | 10/2007 | Pentek et al. |
| 2007/0258167 A1 | 11/2007 | Allen et al. |
| 2008/0002309 A1 | 1/2008 | Hsu et al. |
| 2008/0072417 A1 | 3/2008 | Hsu et al. |
| 2009/0279206 A1 | 11/2009 | Yang et al. |
| 2009/0310256 A1 | 12/2009 | Albrecht et al. |
| 2010/0024201 A1 | 2/2010 | Le et al. |
| 2010/0146773 A1 | 6/2010 | Li et al. |
| 2010/0290157 A1 | 11/2010 | Zhang et al. |
| 2011/0051293 A1 | 3/2011 | Bai et al. |
| 2011/0086240 A1 | 4/2011 | Xiang et al. |
| 2011/0146060 A1 | 6/2011 | Han et al. |
| 2011/0151279 A1 | 6/2011 | Allen et al. |
| 2011/0222188 A1 | 9/2011 | Etoh et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

\* cited by examiner

SYSTEMS AND METHODS FOR USING DOUBLE MASK TECHNIQUES TO ACHIEVE VERY SMALL FEATURES

CROSS-REFERENCE TO RELATED APPLICATION(S)

This application claims priority to provisional U.S. Patent Application Ser. No. 61/894,540 filed on Oct. 23, 2013 and entitled "SYSTEMS AND METHODS TO OPTIMIZE THE WRITER POLE NOSE SHAPE USING A DOUBLE MASK TECHNIQUE," which is incorporated herein by reference.

BACKGROUND

The description that follows includes illustrative systems, methods, techniques, instruction sequences, and computing machine program products that embody the aspects of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

As used herein, the term "or" may be construed in either an inclusive or exclusive sense. Similarly, the term "exemplary" is construed merely to mean an example of something or an exemplar and not necessarily a preferred or ideal means of accomplishing a goal. Additionally, although various exemplary embodiments discussed below focus on quality control of professionals, the embodiments are given merely for clarity and disclosure. Alternative embodiments may employ other systems and methods and are considered as being within the scope of aspects of the present invention. Additionally, for simplicity, some steps may be omitted, interleaved, and/or combined. Also, for simplicity, only single components are shown. However, multiples of each component and/or their sub-components, might be used.

BRIEF DESCRIPTION OF THE DRAWINGS

Various ones of the appended drawings merely illustrate exemplary embodiments of the present invention and cannot be considered as limiting its scope.

DETAILED DESCRIPTION

Exemplary embodiments provide techniques to manufacture writer pole nose shape having very small minimum radius allowing for a much shaper transition from pole to yoke. The small radius writer pole nose shape and other similar small design features present significant and difficult challenges when using photolithography to pattern the desired shape. In the exemplary embodiment of patterning the main pole, optical proximity effect yields rounded nose shapes. Various exemplary embodiments use innovative double mask techniques that significantly reduce optical proximity effect and achieve a wide range of desired shapes. It further provides maximum design flexibility and tuning capability.

Hard Disk Drives (HDD) remain one of the most cost effective means for storage of electronic data. The demand for ever increasing storage capacity is forcing engineers to design and manufacture devices with more strict requirements.

In general, an HDD includes a media (magnetic disk) where magnetic bits on the media are used to store digital data, a magnetic writer writing data onto the media, and a read sensor reading data from the media. The shape and size of the writer pole defines how closely magnetic bits can be written on the media.

Figure 1:
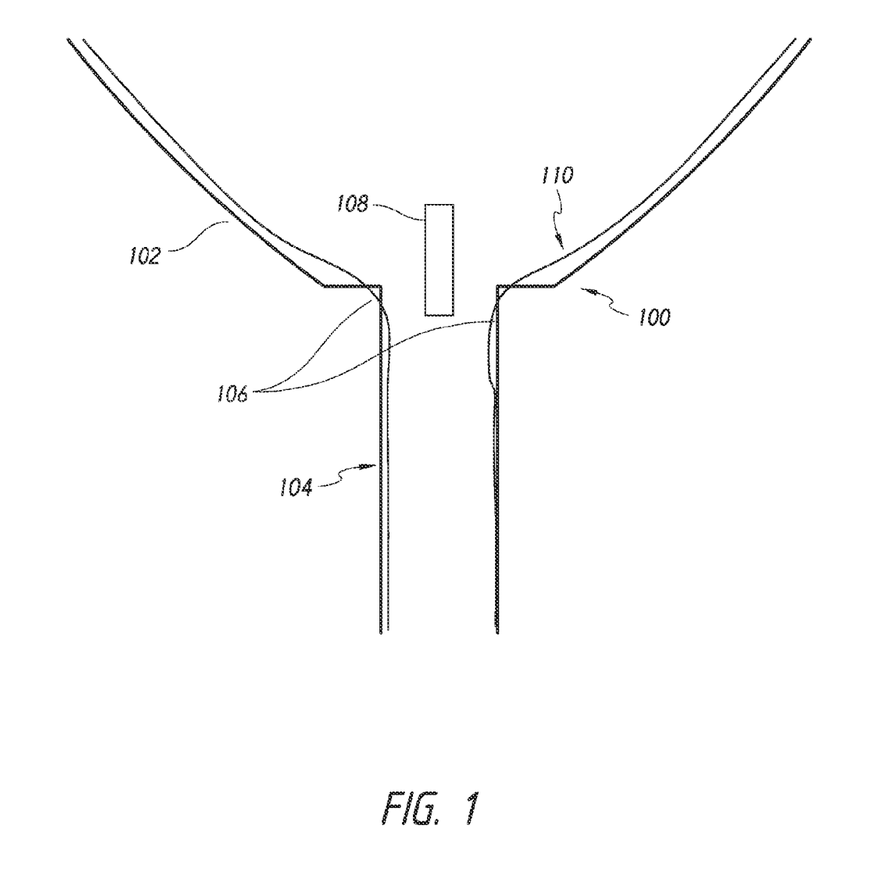
FIG. 1 shows a current mask and simulated resist pattern.
Figure 2:
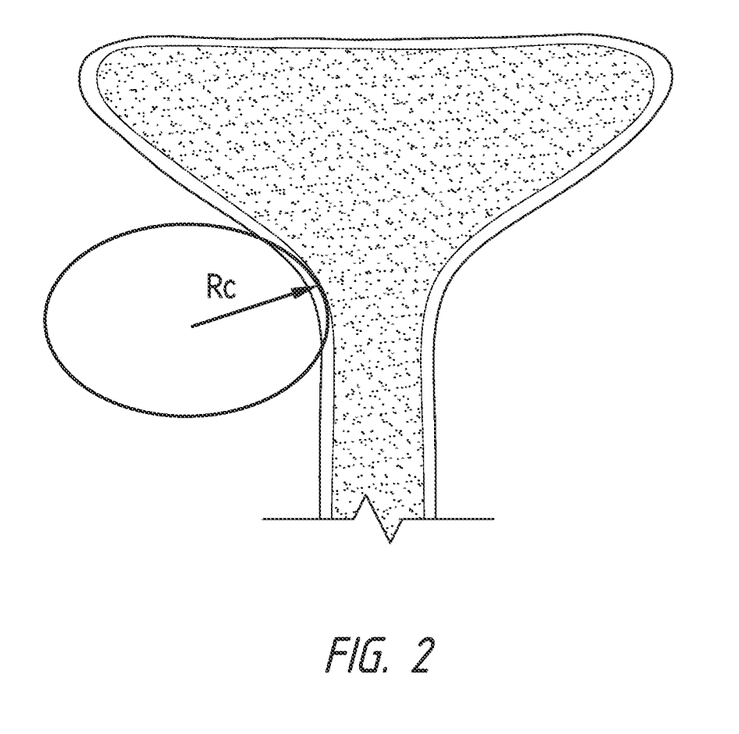
FIG. 2 shows resist pattern and a transition curve from pole to yoke.

FIG. 1 shows a current mask and simulated resist pattern. An exemplary writer pole fabricated using a single mask technique is shown in FIGS. 1 and 2. This exemplary pole shape has been in production for several generations of perpendicular recording media (PMR) products. However, increasing recording density is forcing engineers to reduce the size of the magnetic writer element. In exemplary embodiments, a magnetic write head mask 100 includes a yoke region 102, a main pole region 104, and a transition region 106. The single mask 100 may further include one or more optical proximity effect correction features 108, developed to reduce the effect of optical diffraction and related process limitations that, in the case of the structure shown in FIG. 1 would result in a rounded and less sharply defined transition from the yoke region 102 to the pole region 104. Optical proximity correction (OPC) is a photolithography enhancement technique commonly used to compensate for image errors due to diffraction or process effects. OPC corrects some of the optical diffraction and certain process limitation errors by moving edges of features, or adding extra polygons to the patterns drawn on a photomask. However, OPC has drawbacks and limitations. These drawbacks include issues related to cost, as well as limitations of the corrective effects of OPC technique.

Optical proximity correction (OPC) features may be created using specially designed OPC software or tables. Although the use of OPC features reduce the undesirable effects caused by diffraction and process limitations, for each new shape design, a new mask must be created that includes new OPC features customized to the new structure design. Therefore the use of a single mask technique includes inherent limitations and drawbacks. As seen in the FIG. 1, the shape of the photoresist 110 covering the transition region 106 connecting the yoke region 102 to the main pole region 104 may not exactly match the shape of the mask, and during photo processing the resulting shape of the writer structure may deviate from the desired geometry. This deviation due to optical proximity effect may be more extreme for certain features such as the radius of curvature shown in FIG. 2.

FIG. 2 shows resist pattern and a transition curve from pole to yoke. As shown in FIG. 2, the minimum radius (min Rc) at the nose corner of the yoke is used to characterize the transition curvature from the pole region to the yoke region. A smaller min Rc means sharper transition which corresponds to improved writer characteristics including. New design specifications for future generation devices require much shaper transition curvatures and smaller min Rc. These types of design requirements are very challenging to achieve with the traditional photolithography processes, due to optical proximity effects that yield rounded nose curvature with large min Rc.

Figure 3A:
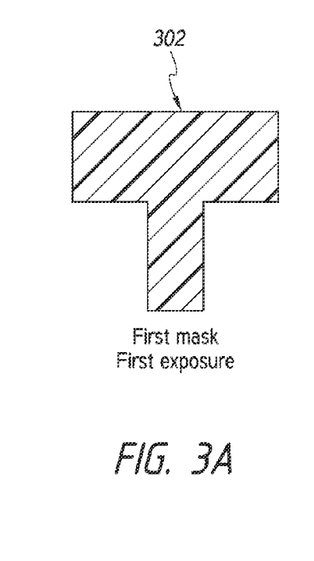
FIGS. 3A-3E show an exemplary two mask embodiments.
Figure 3B:
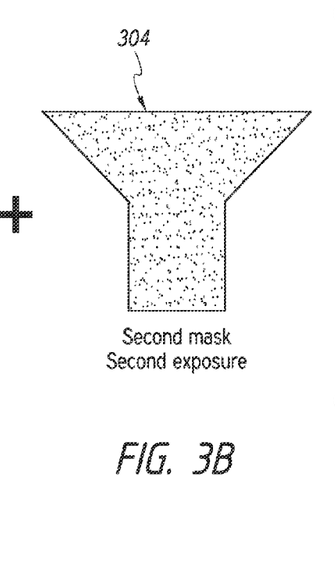
Figures 3C, 3E:
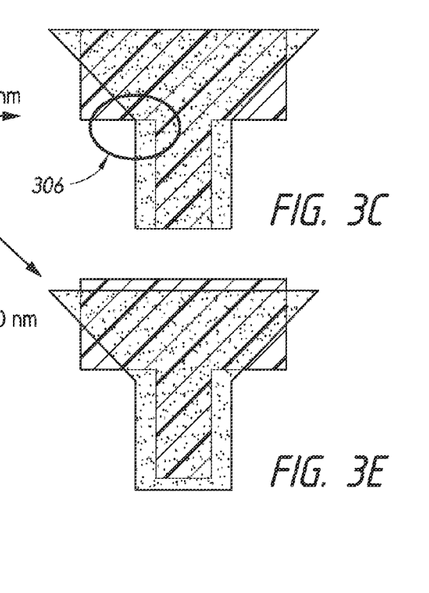
Figure 3D:
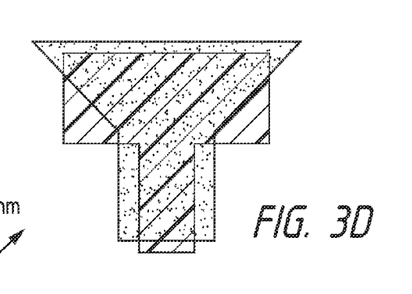

FIGS. 3A-3E show an exemplary two mask embodiment. Exemplary embodiments describe innovative double mask techniques. By separating into two masks the area that covers the nose shaped transition 106, connecting the yoke region 102 to the pole region 104, the interference between the yoke and pole patterns caused by optical proximity effect is largely avoided, resulting in much sharper nose transition and small min Rc. As shown in FIG. 3A, an exemplary rectangular shaped first mask 302 is used to expose the photoresist covering the yoke-pole transition region of the writer 100. FIG. 3B shows an exemplary second mask 304 used to define the yoke to pole region transition shape. The exposure of the photoresist covering the yoke region 102 and pole region 104 through the first mask 302 and then the second mask 304 results in the double exposure of the transition region 306 shown in FIG. 3C. However, the use of two separate masks to achieve the shape and the radius of curvature of the yoke to pole transition region 106 results in lower interference between the competing shapes at the transition region 306, making the formation of a smaller radius of curvature with a sharp transition more feasible. In alternative embodiments, the second mask 304 may be shifted or offset in a vertical direction with respect to the first mask 302 as shown in FIG. 3D, or shifted down with respect to the second mask 302, as shown in FIG. 3E. In yet another alternative embodiment, the second mask 304 may be shifted or offset in a horizontal direction with respect to the first mask 302.

In alternative embodiments, exposure of the photoresist through the first mask 302 may use illumination conditions that have a different intensity as compared to illumination conditions used to expose the photoresist 110 through the second mask 304. In alternative embodiments, a different aperture may be used to expose the photoresist through the first mask 302 than through the second mask 304. In exemplary embodiments, a first aperture in the shape of an annular, a quasar, dipole or a circular (aka conventional) aperture may be used to expose the photoresist 110 through the first mask 302, and a different shaped aperture may be used with the second mask 304. In yet other embodiments, different exposure times may be used with the first mask 302 and the second mask 304. So as shown in FIGS. 3D and 3E, the shifting of the first mask 302 in the vertical or horizontal direction with respect to the second mask 304, in addition to the variation of exposure time, aperture and light intensity between the first and second mask provides the possibility of adjusting multiple parameters to achieve a great deal of flexibility, allowing the designer to fabricate a structure that is closest to the desired shape. It should be apparent to one of skill in the art that newer photolithography tools may provide automatic adjustments for variables such as exposure intensity, exposure time and any degradation or variation in the output of the photolithography illumination source. Therefore, an operator may only need to select the desired exposure dose and aperture type, and the photolithography tool will automatically calculate the proper light intensity and exposure time to provide the desired exposure dose.

Thus, the various embodiments of the double mask techniques taught allow for greater engineering and design flexibility as compared to the traditional single mask techniques. Changing the overlay or offset between the two masks in two exposures, nose shape and curvature can be varied in a wide range. The two exposures can also be optimized separately with different illumination conditions that provide additional shape tuning capability. In summary, various exemplary embodiments provide new double mask techniques to not only achieve shapes requiring smaller min Rc writer nose shape, but also wide range of curvatures and shapes, providing maximum design and shape tuning capabilities by simply changing overlay/offset and illumination conditions.

Figure 4:
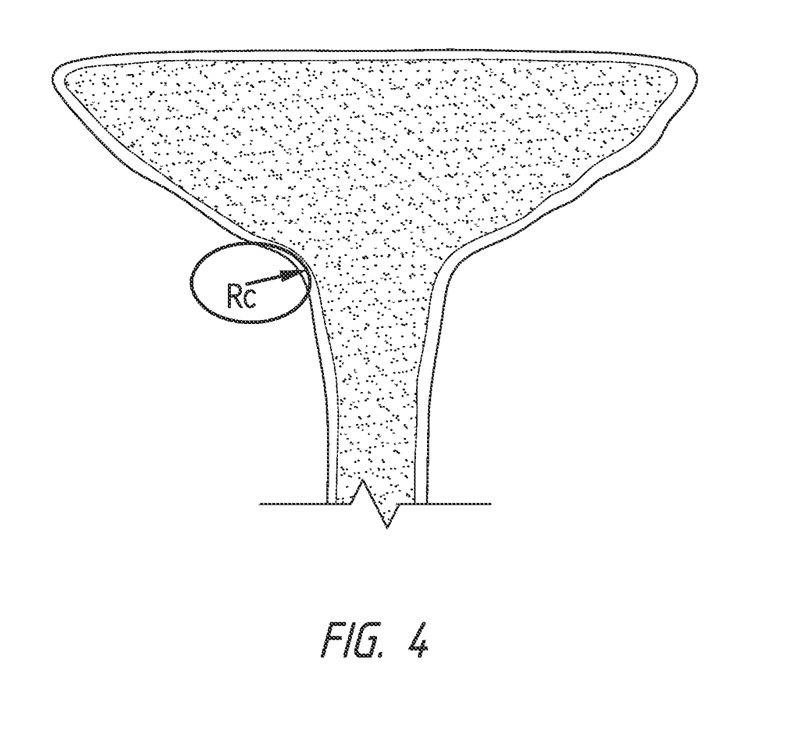
FIG. 4 shows the actual resist image using an embodiment of the double mask technique.
Figure 5:
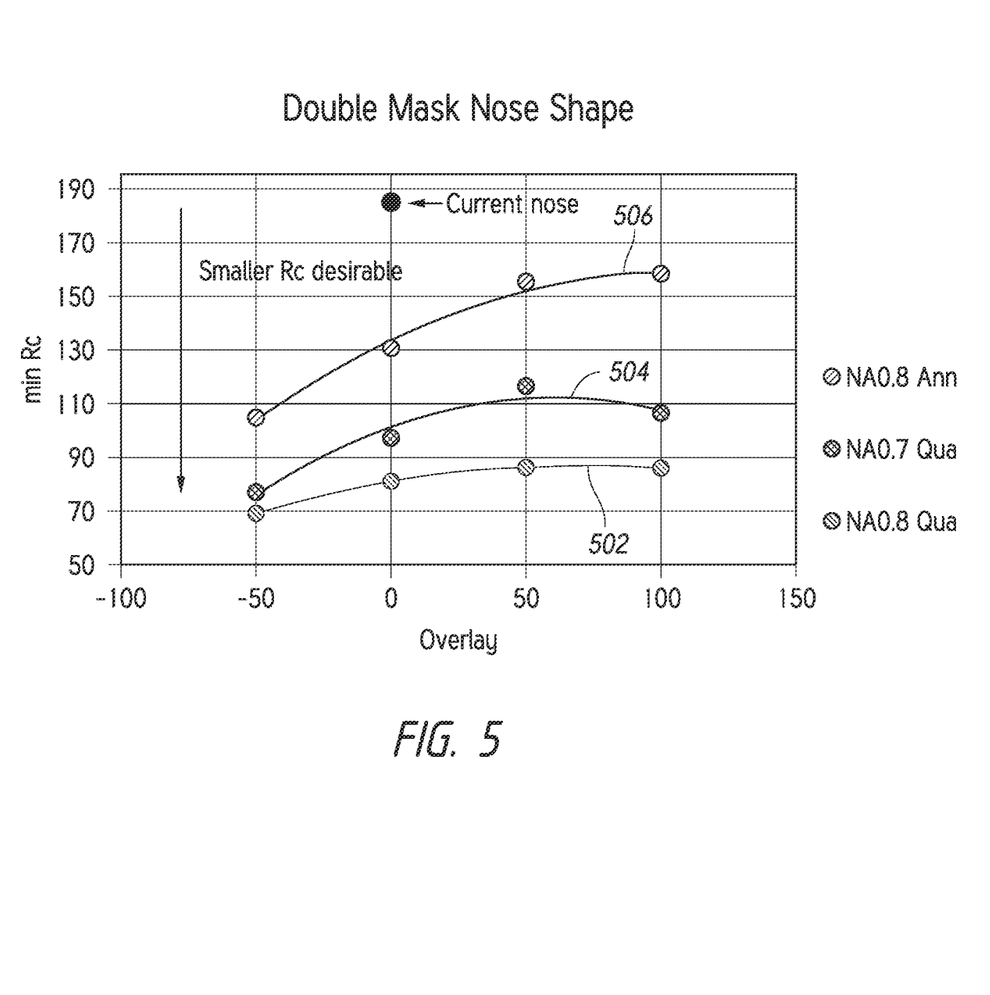
FIG. 5 illustrates experimental results achieved using an embodiment of the double mask technique.

FIG. 4 shows the actual resist image using an embodiment of the double mask technique. As seen in FIG. 4, the minimum Rc achieved using exemplary embodiments disclosed herein is smaller as compared to the minimum Rc possible with traditional techniques. FIG. 5 will further illustrate the range of minimum feature sizes that may be achieved using various exemplary embodiments of the double or multi-mask technique.

FIG. 5 illustrates experimental results achieved using an embodiment of the double mask technique. As shown in FIG. 5, by the changing the overlay between the two masks 302 and 304, transition region radius of curvatures Rc with different minimum curvatures may be achieved. FIG. 5 illustrates the changes in the minimum radius Rc, while the offset is varied in the vertical direction from negative to positive values. The data lines 502, 504 and 506 each correspond to a fixed intensity and aperture settings, while the offset is varied in the vertical direction. For example, the data tracing curve 502 is generated with a quasar shaped aperture, and a 0.8 millijoule/sq cm illumination condition (also referred to as the exposure dose). The offset between the first mask 302 and second mask 304 was varied by moving the second mask 304 with respect to the first mask 302, in the vertical direction from negative fifty nanometer (−50 nm) to positive one hundred nanometer (+100 nm). As seen illustrated by curve 502, the lowest minimum radius of curvature Rc of seventy nanometer (70 nm) was reached. Similarly, curve 504 illustrates that using a quasar aperture and an illumination condition set at 0.8 millijoule/sq cm, a minimum Rc of about 75 nm was achieved at the negative offset of −50 nm. Curve 506 illustrates Rc ranges of about 100 nm to 165 nm, using an annular aperture and an illumination condition or exposure dose set at 0.8 millijoule/sq cm. The ability of using the same two masks and varying the offset between the two masks to achieve a wide range of geometries gives great flexibility to the designers, as well as allowing for great time and cost savings, by avoiding the need for having to manufacture a different mask for each desired shape design. The various embodiments of the two masks offset design provide savings in time, effort and cost of having to create a set of masks for each experimental shape design. In summary, exemplary embodiments provide new double mask techniques to not only achieve shapes requiring smaller min Rc writer nose shape, but also wide range of curvatures and shapes, providing maximum design and shape tuning capabilities by simply changing offset and illumination conditions.

Figure 6:
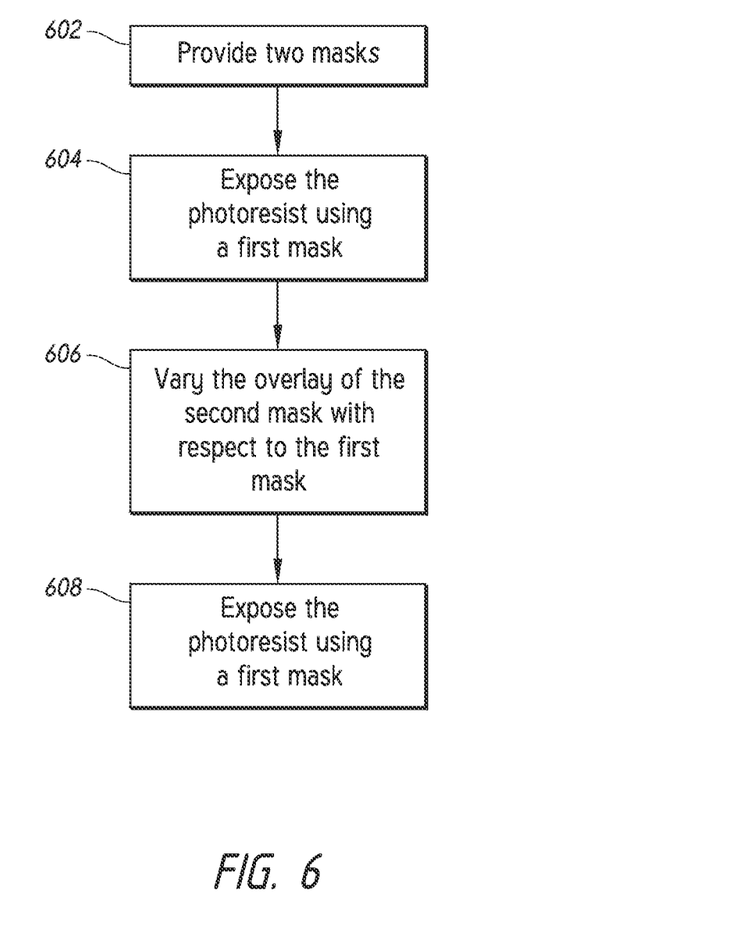
FIG. 6 illustrates method of manufacturing a magnetic pole according to an exemplary embodiment.

FIG. 6 illustrates a method of manufacturing a magnetic pole according to an exemplary embodiment. In operation 602, two photomasks are designed to form the features of the main pole. In order to achieve the transition from the yoke region 102 to the main pole region 104 with a small radius of curvature, a first mask 302 defining the main pole wide is formed. The second mask 304 roughly defines the shape of the transition region. The shape of the transition region is actually defined by the combination the two masks 302 and 304, the adjustment of the offset between the first and second mask, as well as other exposure parameters or illumination conditions.

In operation 604, the photoresist 110 covering the yoke 102 and pole region 104 is exposed using the first mask 302. In operation 606, the photoresist 110 is exposed using the second mask 304. The offset of the second mask 304 with respect to the first mask 302 is adjusted to achieve the optimum transition shape and lowest radius of curvature for the yoke 102 and main pole region 104.

In operation 608, the photoresist is exposed through the second mask with the proper vertical or horizontal offset to best achieve the desired yoke to pole transition region. As previously described, exposure parameters such the aperture and, the illumination or light intensity may also vary when exposing the photoresist layer using the first and second mask. For example the first exposure may use an annular quasar aperture shape with the first mask and a different aperture shape may be used with the second mask. Similarly, the illumination conditions may be varied between the exposure through the first and second mask. In summary, exemplary embodiments provide for new double mask techniques to not only achieve shapes requiring smaller min Rc writer nose shape, but also wide range of curvatures and shapes, providing maximum design and shape tuning capabilities by simply changing offset and illumination conditions.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A method of taking advantage of the optical proximity effects in the fabrication of thin film heads (TFH) including small features, the method comprising:
   providing at least a first and second photolithography masks (mask) corresponding to a desired shape, wherein each of the first and the second masks includes one critical feature of the desired shape; and
   sequentially exposing a photoresist layer covering an area corresponding to the desired shape using the at least first and second masks.

2. The method of claim 1 further comprising:
   adjusting an offset between the at least first and second masks to modify features of the desired shape.

3. The method of claim 1 wherein a decrease in the offset increases the sharpness of the desired shape.

4. The method of claim 1 further comprising:
   exposing the photoresist layer through the first mask with a first set of illumination conditions and exposing the photoresist layer through the second mask with a second set of illumination conditions.

5. The method of claim 4 wherein the first and the second set of illumination conditions are the same.

6. The method of claim 4 wherein the first and the second set of illumination conditions are different.

7. The method of claim 1, wherein the desired shape forms a transition from a yoke region to a main pole region in a magnetic writer.

8. The method of claim 7, wherein the desired shape is a partial circular shape with a minimum radius of less than 100 nm.

9. The method of claim 7, wherein the desired shape is a partial circular shape with a minimum radius of less than 80 nm.

10. The method of claim 1 wherein the first mask has a T shape.

11. The method of claim 10 wherein the width of an upper rectangle of the T shape is between 1 micron to 0.5 microns and the width of the lower rectangle is between 200 nm to 500 nm.

12. The method of claim 1, wherein the second mask has a funnel shape.

13. The method of claim 1, wherein the width of the upper part of the funnel is between 2.5 microns to 1 micron and the width of the lower part of the funnel is between 400 nm to 700 nm.

14. The method of claim 1 wherein the illumination conditions parameters include the light shape, intensity, exposure time and aperture.

15. The method of claim 14, wherein the aperture includes quasar aperture, annular aperture and circular aperture.

16. A method of using a double mask technique for optimizing a shaped transition having a shape and curvature, and connecting a main pole to a yoke region in a magnetic write head, the method comprising:
   providing a first photo mask (mask) including a first set of features corresponding to a shaped transition region, wherein the transition connects a main pole region to a yoke region;
   providing at least a second mask including a second set of features corresponding to the shaped transition region;
   exposing the transition region sequentially through the first mask and the at least second mask, wherein the sequential exposure through the first mask and the second mask utilizes optical proximity effects to minimize distortions of the shaped transition region.

17. The method of claim 16, further comprising:
   exposing the shaped transition region through the first mask using a first set of illumination conditions; and
   exposing the shaped transition region through the second mask using a second set of illumination conditions.

18. The method of claim 16, further comprising:
   adjusting an offset between the first mask and the second mask, in order to tune the shape and the curvature of the shaped transition region.

19. The method of claim 18 wherein the first set of illumination conditions are different from the second set of illumination conditions.

* * * * *